United States Patent
Yoshikawa et al.

(10) Patent No.: US 6,623,400 B2
(45) Date of Patent: Sep. 23, 2003

(54) TOROIDAL-TYPE CONTINUOUSLY VARIABLE TRANSMISSION

(75) Inventors: Tomonobu Yoshikawa, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 127 days.

(21) Appl. No.: 09/981,748

(22) Filed: Oct. 19, 2001

(65) Prior Publication Data

US 2002/0086767 A1 Jul. 4, 2002

(30) Foreign Application Priority Data

Oct. 20, 2000 (JP) ................................. P. 2000-321438

(51) Int. Cl.$^7$ ............................................. F16H 55/32
(52) U.S. Cl. .......................... 476/73; 476/72; 384/912
(58) Field of Search ............................. 476/40, 42, 72, 476/73; 384/912, 492, 569, 615, 622

(56) References Cited

U.S. PATENT DOCUMENTS

| 5,735,769 A | | 4/1998 | Takemura et al. | |
| 5,976,053 A | * | 11/1999 | Kino et al. | 476/73 |
| 6,066,068 A | | 5/2000 | Takemura et al. | |
| 6,074,324 A | * | 6/2000 | Ishikawa et al. | 476/42 |
| 2002/0082133 A1 | * | 6/2002 | Yoshikawa et al. | 476/46 |
| 2003/0013574 A1 | * | 1/2003 | Misada et al. | 476/40 |
| 2003/0040401 A1 | * | 2/2003 | Okita et al. | 476/73 |

FOREIGN PATENT DOCUMENTS

| JP | 2-49411 | 12/1990 |
| JP | 7-286649 | 10/1995 |
| JP | 9-79336 | 3/1997 |
| JP | 10-231908 | 9/1998 |
| JP | 11-141638 | 5/1999 |
| JP | 2000-291757 | 10/2000 |

OTHER PUBLICATIONS

Japanese abstract, 10231908, Sep. 2, 1998.
Japanese abstract, 2000-291757, Oct. 20, 2000.
Japanese abstract, 2049411, Feb. 19, 1990.
Japanese abstract, 9079336, Mar. 25, 1997.

* cited by examiner

Primary Examiner—David Fenstermacher
(74) Attorney, Agent, or Firm—Sughrue Mion, PLLC

(57) ABSTRACT

In the thus structured toroidal-type continuously variable transmission, at least one of the concave surface of the input side disk, the concave surface of the output side disk, the convex surfaces of the power rollers, the raceway surfaces of the inner races of the power roller bearings, and the raceway surfaces of the outer races of the power roller bearings is, after heat treatment, subjected to grinding, superfinishing and shot-peening and then surperfinishing again, and the resultant surface residual compression stress is in the range from −780 to −1800 MPa.

4 Claims, 2 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission which is used, for example, as an automatic transmission for a vehicle and, in particular, to such toroidal-type continuously variable transmission which is enhanced in the durability of its component parts such as disks and power rollers.

2. Description of the Related Art

Conventionally, as a toroidal-type continuously variable transmission, there is known a toroidal-type continuously variable transmission having such a structure as shown in FIG. 1.

Within a housing (not shown), specifically, on an input shaft 3 rotatably supported in the interior of the housing, there are disposed an input side disk 1 and an output side disk 2 in such a manner that they are concentric with and opposed to each other. The input shaft 3 is penetrated through the axial core portion of a toroidal transmission part including the input side disk 1 and output side disk 2. A loading cam 4 is disposed on one end of the input shaft 3. This loading cam 4 is structured such that it can transmit the power (rotational force) of the input shaft 3 to the input side disk 1 through a cam roller 5. Referring in more detail to the structures of the input side and output side disks 1 and 2, they respectively include inner surfaces formed as concave surfaces each having an arc-shaped section, have substantially the same shape, and are disposed concentric with each other with their respective inner surfaces opposed to each other. These mutually opposed surfaces are respectively formed as toroidal surfaces such that they cooperate together in forming a substantially semicircular shape, when the present toroidal-type continuously variable transmission is viewed as a section in the axial direction thereof.

Within a toroidal cavity defined by the toroidal surfaces of the input side and output side disks 1 and 2, there are disposed a pair of power roller bearings 6 and 7 which are respectively thrust rolling bearings, in such a manner that they are in contact with the input side and output side disks 1 and 2. By the way, the power roller bearing 6 is composed of a power roller 6a (which corresponds to an inner race forming the power roller bearing 6) which can roll on the toroidal surfaces of the input side and output side disks 1 and 2, an outer race 6b, and a plurality of rolling bodies (steel balls) 6c. On the other hand, the power roller bearing 7 is composed of a power roller 7a (which corresponds to an inner race forming the power roller bearing 7) which can roll on the toroidal surfaces of the input side and output side disks 1 and 2, an outer race 7b, and a plurality of rolling bodies (steel balls) 7c; and, the power roller bearing 7 is used to support a thrust load that is applied to the power roller.

That is, the power roller 6a also plays the role of an inner race which is a component of the power roller bearing 6, while the power roller 7a also plays the role of an inner race which is a component of the power roller bearing 7. In the present structure, the power roller 6a is pivotally and rotatably mounted through a pivot shaft 8, the outer race 6b and the plurality of rolling bodies 6c on a trunnion 10 swinging about a pivot shaft 9 disposed at a position which is perpendicular to an axial line of the input shaft 3 and does not intersect the axial line thereof (hereinafter, this physical relationship is referred as "a torsional position"). And, at the same time, the power roller 6a includes a peripheral surface formed as a spherical-shaped convex surface, and is inclinedly supported about displacement shafts 0, which are respectively supported on their associated trunnions and serve as the centers of the toroidal surfaces of the input side and output side disks 1 and 2. On the other hand, the power roller 7a is pivotally and rotatably mounted through a pivot shaft 9, the outer race 7b and the plurality of rolling bodies (steel balls) 7c on a trunnion 11 swinging about a pivot shaft 9 disposed at the torsional position with respect to the input shaft 3; and, at the same time, the power roller 7a is inclinedly supported about displacement shafts 0, which respectively serve as the centers of the toroidal surfaces of the input side and output side disks 1 and 2. And, these power rollers 6a and 7a transmit the power of the input shaft 3 to the input side and output side disks 1 and 2.

By the way, the input side and output side disks 1 and 2 are independent from the input shaft 3 with needle rollers 12 between them (that is, they are held in such a state where they are not directly influenced by the power of the input shaft 3). On the output disk 2, there is disposed an output shaft 14 which is arranged in parallel to the input shaft 3 and is also rotatably supported on the housing (not shown) through angular bearings 13. In the present toroidal-type continuously variable transmission 20, the power of the input shaft 3 is transmitted to the loading cam 4. And, in case where the loading cam 4 is rotated due to such power transmission to the loading cam 4, power caused by the rotation of the loading cam 4 is transmitted through the cam roller 5 to the input side disk 1, so that the input side disk 1 can be rotated. Further, power generated due to the rotation of the input side disk 1 is transmitted through the power rollers 6a and 7a to the output side disk 2. As a result of this, the output side disk 2 can be rotated integrally with the output shaft 14.

In transmission, the trunnions 10 and 11 are respectively moved by a slight distance in the directions of the displacement shafts 0. That is, the axial-direction movements of the trunnions 10 and 11 shift slightly the intersection between the rotary shafts of the power rollers 6a, 7a and the axes of the input side and output side disks 1 and 2. This intersection shift loses balance between the rotational peripheral speed of the power rollers 6a, 7a and the rotational peripheral speed of the input side disk 1; and, due to the component of the rotation driving force of the input side disk 1, the power rollers 6a, 7a are caused to roll inclinedly around the displacement shafts 0. Therefore, the power rollers 6a, 7a are allowed to roll inclinedly on the curved surfaces of the input side and output side disks 1 and 2. As a result of this, the speed ratio is changed: that is, deceleration or acceleration is carried out.

As a toroidal-type continuously variable transmission having the above structure, for example, there is known a conventional toroidal-type continuously variable transmission which is disclosed in JP-B-2-49411U. And, as the input side disk, output side disk and power roller bearings of the above type, as set forth in [NASA Technical note NASA ATN D-8362], there are conventionally known input side disk, output side disk and power roller bearing which use AISI52100 (JIS SUJ2, corresponding to high-carbon chromium bearing steel); and, as disclosed in JP-A-9-79336, there are known disks and bearings in which SCM420, that is, steel for mechanical structural purposes containing Cr is carbonitrided.

In the above-mentioned conventional toroidal-type continuously variable transmission, when it is driven, there are generated high contact pressures respectively between the input side disk and power roller bearings, between the output side disk and power roller bearings, and between the power roller inner and outer races and rolling bodies. These high contact pressures are combined with lubricating oil (traction oil) existing between the input side and output side disks and power roller bearings, and between the power roller raceway surfaces and rolling bodies to lower the fatigue lives of the contact surfaces. Therefore, for the purpose of enhancing the rolling fatigue life under the high contact surface pressure and high temperature conditions, conventionally, the input side and output side disks as well as the inner races or outer races of the power roller bearings are carburized or carbonitrided to thereby prevent the high temperature strength of the surfaces thereof from lowering. Also, in order to extend the lives of the disks and power roller bearings, as disclosed in U.S. Pat. No. 5,735,769, JP-A-10-231908, and U.S. Pat. No. 6,066,068, conventionally, the rolling surfaces of them are treated by shot peening to thereby apply residual compressive stresses to them, with the result that the lives of the disks and power roller bearings can be effectively extended.

However, the above-mentioned measures are mainly the rolling fatigue measures when foreign substances such as iron powder are not mixed in the lubricating oil. In the actual toroidal-type continuously variable transmission, iron powder, which stuck to a gear when the toroidal-type continuously variable transmission was manufactured, is mixed into the lubricating oil, and such iron powder is bitten into the contact portions between the disks and power rollers to thereby cause impressions in the disk rolling portions and power roller rolling portions; and, the peripheries around these impressions provide stress concentration areas and, therefore, there can be occurred cracks in these areas, to thereby generate the flaking.

As a measure against the shortened life caused by the biting of the foreign substances, conventionally, there is taken a measure in which the quantity of retained austenite is increased to thereby relieve the stresses in the peripheries around the impressions. However, in the portion subjected to shot-peening, the retained austenite is reduced in quantity due to the transformation of the processing induced martensite, that is, the quantities of retained austenite in such shot-peening portions are below the retained austenite 15% in which a life extension effect can be obtained. Therefore, the shot peening, which was enforced for the purpose of enhancement in the lives of the foreign-substance-bitten portions, results in that the foreign-substance-bitten portions are flaked to thereby shorten the lives thereof.

SUMMARY OF THE INVENTION

The invention aims at eliminating the drawbacks found in the above-mentioned conventional toroidal-type continuously variable transmission. Accordingly, it is an object of the invention to provide a toroidal-type continuously variable transmission in which at least one of the concave surface of an input side disk, the concave surface of an output side disk, the convex surfaces of power rollers, the raceway surfaces of the inner races of power roller bearings, and the raceway surfaces of outer races of power roller bearings are, after heat treatment, ground, superfinished, subjected to shot-peening, and superfinished again to provide the surface residual compressive stresses in the range from −780 to −1800 MPa, thereby being able to obtain a good life extension effect when compared with the conventional toroidal-type continuously variable transmission.

Also, it is a second object of the invention to provide a toroidal-type continuously variable transmission which, by providing the surface retained austenite of 15% or more, can obtain a good life extension effect with respect to the flaking caused by the biting of foreign substances.

Further, it is a third object of the invention to provide a toroidal-type continuously variable transmission which, in the depth of 50 μm from the surface, by providing the retained austenite of 20% or more, can greatly extend the lives of the components thereof with respect to the flaking caused by the biting of foreign substances.

In attaining the above objects, according to a first aspect of the invention, there is provided a toroidal-type continuously variable transmission, including:

an input shaft supported so as to be freely rotatable;

an input side disk rotatable together with the input shaft and including an inner surface formed as a concave surface having an arc-shaped section;

an output side disk including an inner surface formed as a concave surface having an arc-shaped section, the output side disk being disposed concentrically with the input side disk in such a manner that the inner surface thereof is opposite to the inner surface of the input side disk;

a plurality of trunnions respectively swingable about their associated pivot shafts disposed at tortional positions with respect to the input shaft;

a plurality of displacement shafts respectively supported on the trunnions;

a plurality of power rollers each including a peripheral surface formed as a spherical-shaped convex surface, disposed on the inner surfaces of the trunnions, and rotatably supported in the peripheries of the displacement shafts while the power rollers are held by and between the input side and output side disks; and, thrust rolling bearings for supporting thrust loads applied to the power rollers, each of the thrust rolling bearings including:
an inner race raceway formed in the outer peripheral surface of the power roller; and
an outer race disposed inside the trunnion and having an outer race raceway, wherein at least one of the concave surface of the input side disk, the concave surface of the output side disk, the convex surfaces of the power rollers, the inner race raceways and the outer race raceways of the thrust rolling bearings, after heat treatment, subjected to grinding, superfinishing, shot-peening, and superfinishing again in this order, and the value of the resultant surface residual compression stress is in the range from −780 to −1800 MPa.

Also, according to a second aspect of the invention, in the toroidal-type continuously variable transmission as set forth in the first aspect of the invention, at least one of the concave surface of the input side disk, the concave surface of the output side disk, the convex surfaces of the power rollers, the inner race raceways and the outer race raceways of the thrust rolling bearings is, after heat treatment, subjected to grinding, superfinishing, shot-peening, and superfinishing again in this order, and the value of the resultant surface residual compression stress is in the range from −780 to −1800 MPa and the quantity of the resultant retained austenite is 15% or more.

Further, according to a third aspect of the invention, in the toroidal-type continuously variable transmission as set forth in the first aspect of the invention, at least one of the concave surface of the input side disk, the concave surface of the output side disk, the convex surfaces of the power rollers, the inner race raceways and the outer race raceways of the thrust rolling bearings is, after heat treatment, subjected to grinding, superfinishing, shot-peening, and superfinishing again in this order, and the value of the resultant surface residual compression stresses is in the range from −780 to −1800 MPa, the quantity of the resultant retained austenite is 15% or more, and the quantity of the resultant retained austenite in the depth of 50 µm from the surface is 20% or more.

DETAILED DESCRIPTION OF THE PREFERRED EMBODIMENTS

Figure 1:
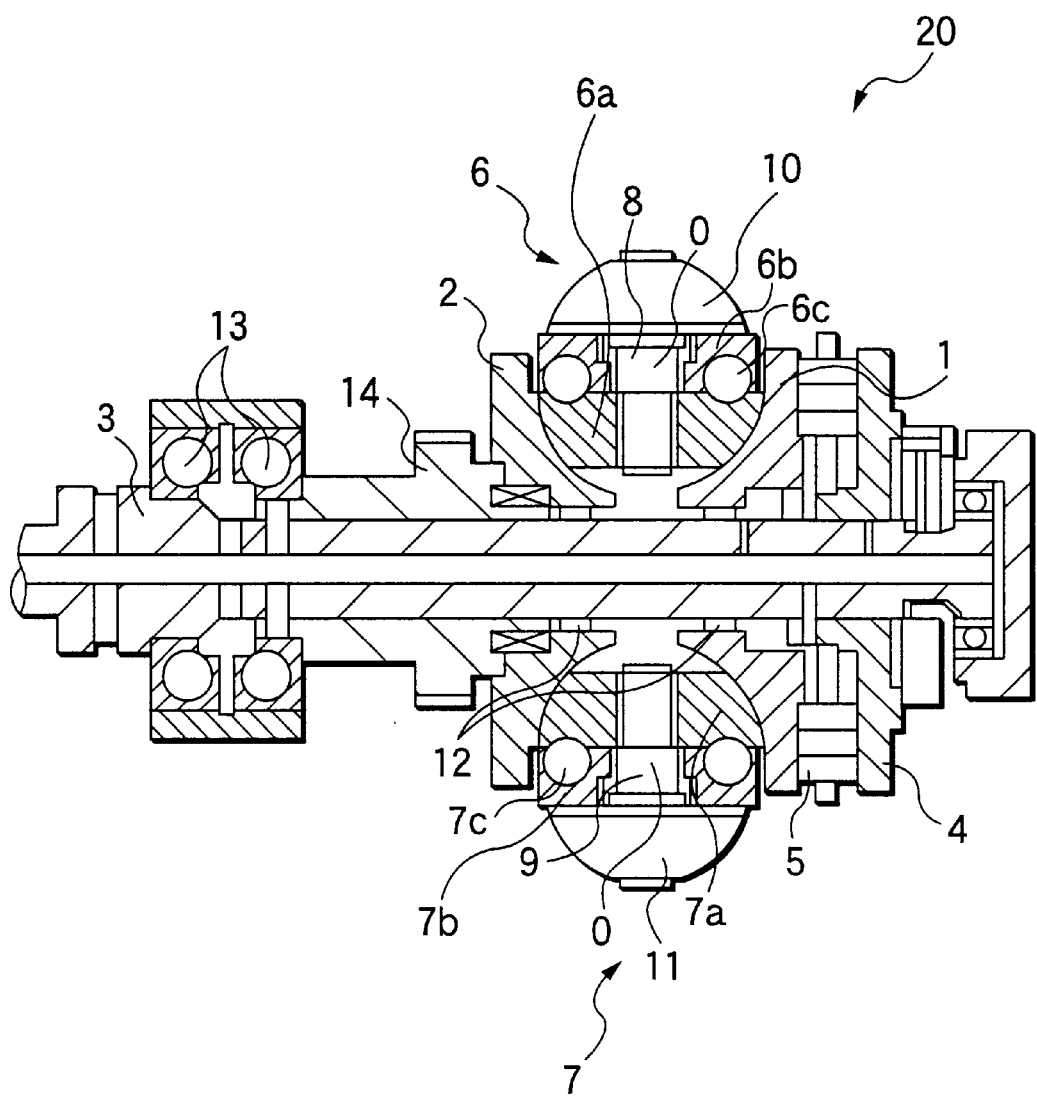
FIG. 1 is an explanatory view of a toroidal-type continuously variable transmission; and, FIG. 2 is a graphical view of a thermal treatment characteristic according to a toroidal-type continuously variable transmission of the present invention.

Now, description will be given below in more detail of a toroidal-type continuously variable transmission according to the invention.

In the case of a toroidal-type continuously variable transmission, high pressures in the rolling contact portions thereof and oil referred to as traction oil having high viscous frictional resistance shorten rolling fatigue lives of the rolling contact portions. For this reason, compressive residual stresses are applied to these portions by shot peening. However, since the shot peening turns the retained austenite into martensite due to the process induced transformation, the quantity of the retained austenite is lowered, thereby shortening the rolling fatigue lives of the rolling contact portions into which foreign substances are bitten.

Therefore, there is necessary a working method which can provide not only a high residual compression stress but also a proper quantity of retained austenite. Conventionally, in the toroidal-type continuously variable transmission, the shot peening is executed after heat treatment or after grinding working. Since the shot peening roughens the surface shape, in order to work the surface of the rolling contact portion after the shot peening at the same roughness level as the roughness of the bearing surface, there is necessary a large finishing allowance. For this reason, with the finishing allowance taken into account, the shot peening must be executed under the condition that the residual stress is applied to a position fairly deep from the surface.

According to the invention, the surface to be shot-peened is firstly superfinished to thereby finish the shape of the surface and, after then, the surface is subjected to the shot-peening. In this working, the shot peening is carried out under the condition that the surface is prevented from loosing its shape greatly.

For example, there are used micro media each having a particle diameter in the range of 30–70 µm. These are alumina oxide or glass beads, while the hardness thereof is in the range of HV700–1100. These media are projected with a projection pressure in the range of 0.2–0.6 MPa. Here, the resultant residual compressed layer is a polar surface layer having a depth of 50–60 µm from the surface, while the residual compressive stress is in the range from −490 to −2450 MPa.

After execution of the shot peening treatment, the surface is greater in roughness than before it is shot-peened. However, not only because the surface is superfinished once and but also because the shape of the surface is not changed excessively by the shot-peening treatment executed here, by working the surface in the range of 5–20 µm by superfinishing, there can be obtained the same surface shape and roughness as before the surface is shot-peened.

Also, since the shot peening executed under the above conditions can reduce the decrease rate of the retained austenite, in a state where the surface is superfinished after the shot peening, the quantity of the surface retained austenite can be set at 15% or more.

Further, because the layer tb be worked by shot peening is limited to the very thin surface layer, in a state where the surface is superfinished after the shot peening, at a position of 50 µm from the surface, there can be obtained the quantity of the retained austenite equivalent to the quantity of the retained austenite that is obtained when the surface is heat treated. That is, since the quantity of the retained austenite that is obtained when the surface is heat treated is 20% or more, even in case where the shot peening according to the invention is executed, there can be obtained the quantity of retained austenite which is equivalent to 20% or more.

The surface retained austenite of 15% or more and the retained austenite of 20% or more at a position of 50 µm from the surface can relieve the stress concentration in the peripheries of impressions caused by the biting of foreign substances into the surface, thereby being able to enhance the flaking life of the surface.

EXAMPLES

Now, description will be given below of examples of a toroidal-type continuously variable transmission according to the invention. By the way, the basic structure of a toroidal-type continuously variable transmission according to the invention is similar to the structure shown in FIG. 1; and, thus the concave surface of an input side disk, the concave surface of an output side disk, the convex surfaces of power rollers, the raceway surfaces of the inner races of power roller bearings, and the raceway surfaces of the outer races of the power roller bearings are shot-peened respectively.

Figure 2:
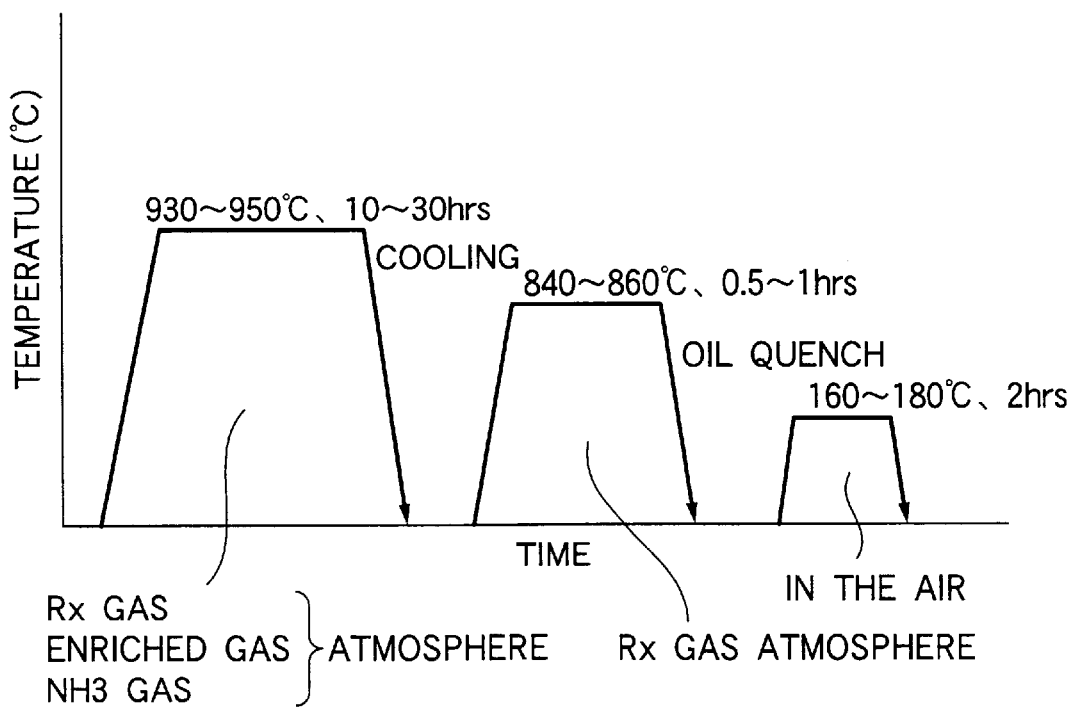

For the input side and output side disks as well as power roller inner and outer races, there is used steel for mechanical structural purposes, that is SCM435, and such a heat treatment shown in FIG. 2 was performed on these components. Specifically, these components are heat-treated for 10 to 30 hours in Rx gas, enriched gas, and ammonia ($NH_3$) gas whose temperature ranges from 930 to 950° C., then, after cooling, heat-treated for 0.5–1 hour in Rx gas atmosphere whose temperature ranges from 840 to 860° C., and thereafter oil-quenched, and then heated for 2 hours in the atmosphere whose temperature ranges from 160 to 180° C. After the heat treatment, they were ground and superfinished and, after then, the rolling surfaces of the respective components were shot-peened under the following conditions:
(Shot-Peening Conditions)

Projection material: Alumina oxide and glass beads

Particle diameter of projection material: 30–70 µm

Hardness of projection material: HV700–1000

Projection pressure: 0.1–1 MPa

Projection time: 10–60 minutes

After the shot-peening, the rolling surfaces were superfinished. In this case, the surface finishing allowance was 5–20 µm. The following table 1 shows the surface residual stress values, surface retained austenite quantities, and retained austenite quantities in the depth of 50 μm of the disks and power rollers that were used in our test after completion of the superfinishing operation. These values are the measured values of samples picked out from the disks and power rollers that were shot-peened and superfinished under the same conditions. By the way, when measuring the retained austenite quantities in the depth of 50 μm, the samples were electrolytic polished until the depth of 50 μm and, after then, the retained austenite quantities were measured.

TABLE 1

| | Surface residual stress (MPa) | Surface retained austenite (%) | Retained austenite in depth of 50 μm (%) |
|---|---|---|---|
| Embodiments | | | |
| 1 | −1000 | 23 | 24 |
| 2 | −813 | 26 | 26 |
| 3 | −1480 | 19 | 30 |
| 4 | −1744 | 16 | 23 |
| 5 | −1176 | 17 | 23 |
| Comparison Examples | | | |
| 1 | −706 | 24 | 27 |
| 2 | −1842 | 11 | 28 |
| 3 | −1078 | 13 | 29 |
| 4 | −960 | 17 | 17 |

After execution of the shot-peening under the above conditions, by changing the projection pressure and projection time within above range, there could prepared samples having different residual stresses and retained austenite quantities. Here, a mark [−] applied before the residual stress quantity shows that the residual stress is a compressive stress.

Tests were conducted using the CVT unit shown in Table 1. And, tests were conducted under the following two conditions:

(1) lubricating environment in which no foreign substance such as iron powder is not contained in lubricating oil; and, (2) lubricating environment in which iron powder is contained in lubricating oil.

Test (1)
　　Input shaft speed: 4000 rpm
　　Input torque: 350 Nm
　　Torque used: Traction oil
　　Oil supply temperature: 100° C.

Test (2)
　　Input shaft speed: 4000 rpm
　　Input torque: 350 Nm
　　Torque used: Traction oil
　　Oil supply temperature: 100° C.
　　Iron powder:
　　　　Size: 70–147 μm
　　　　Hardness: HV500–600
　　　　Quantity: 600 ppm The following table 2 shows the results of the above durability tests. Each test was conducted seven times, and ended at the time when the rolling surfaces of either of the disks or power rollers were flaked. The obtained test results were arranged according to the Weibull distribution method, and were expressed using the 90% life expectancy ($L_{10}$). Also, in the case of the test samples in which no flaking occurred, the test was suspended in 200 hrs.

TABLE 2

| | Test 1 ($L_{10}$) | Test 2 ($L_{10}$) |
|---|---|---|
| Examples | | |
| 1 | None of them were damaged within 200 hrs. | 188 hr |
| 2 | None of them were damaged within 200 hrs. | 176 hr |
| 3 | None of them were damaged within 200 hrs. | 153 hr |
| 4 | None of them were damaged within 200 hrs. | 166 hr |
| 5 | None of them were damaged within 200 hrs. | 170 hr |
| Comparison Examples | | |
| 1 | 142 hr | 90 hr |
| 2 | None of them were damaged within 200 hrs. | 51 hr |
| 3 | None of them were damaged within 200 hrs. | 64 hr |
| 4 | None of them were damaged within 200 hrs. | 83 hr |

The test results showed that none of the examples were damaged within 200 hrs. under the clean lubricating environment of the test 1. Also, a long life could be obtained even under the foreign-substance-mixed lubricating environment of the test 2.

In the case of the comparison example 1, since the surface residual stress is low, that is, −706 MPa, the flaking occurred in a short time in the test 1. Also, in the case of the comparisons 2, 3 and 4, because the surface residual stress is high, that is, −780 MPa or more, no damage occurred in 200 hrs. in the test 1.

However, in the test 2, since the surface retained austenite of the comparison examples 2 and 3 is less than 15%, there could be obtained only a shortlife. Also, in the case of the comparison example 4, because the retained austenite in the depth of 50 μm is less than 20%, there could be obtained only a short life.

As has been described heretofore in detail, according to the invention, at least one of the concave surface of the input side disk, the concave surface of the output side disk, the convex surfaces of the power rollers, the raceway surfaces of the inner races of the power roller bearings, and the raceway surfaces of the outer races of the power roller bearings are, after heat treatment, ground, superfinished and shot-peened; and, after then, they are superfinished again to thereby provide the surface residual compression stress in the range from −780 to −1800 MPa. Thanks to this, there can be provided a toroidal-type continuously variable transmission in which the input side disk, output side disk, power roller inner races and power roller outer races have very long lives even under the lubricating environment containing any foreign substance such as iron powder.

What is claimed is:

1. A toroidal-type continuously variable transmission, comprising:
　an input shaft supported so as to be freely rotatable;
　an input side disk rotatable together with said input shaft and including an inner surface formed as a concave surface having an arc-shaped section;
　an output side disk including an inner surface formed as a concave surface having an arc-shaped section, said output side disk being disposed concentrically with said input side disk in such a manner that said inner surface thereof is opposite to said inner surface of said input side disk;
　a plurality of trunnions respectively swingable about their associated pivot shafts disposed at tortional positions with respect to said input shaft;
　a plurality of displacement shafts respectively supported on said trunnions;

a plurality of power rollers each including a peripheral surface formed as a spherical-shaped convex surface, disposed on the inner surfaces of said trunnions, and rotatably supported in the peripheries of said displacement shafts while said power rollers are held by and between said input side and output side disks; and, thrust rolling bearings for supporting thrust loads applied to said power rollers, each of said thrust rolling bearings including:

an inner race raceway formed in the outer peripheral surface of said power roller; and an outer race disposed inside said trunnion and having an outer race raceway, wherein at least one of said concave surface of said input side disk, said concave surface of said output side disk, said convex surfaces of said power rollers, said inner race raceways and said outer race raceways of said thrust rolling bearings is, after heat treatment, subjected to grinding, superfinishing, shot-peening, and superfinishing again in this order, and the value of the resultant surface residual compression stress is in the range from −780 to −1800 MPa.

2. A toroidal-type continuously variable transmission as set forth in claim 1, wherein the quantity of the resultant surface retained austenite is 15% or more.

3. A toroidal-type continuously variable transmission as set forth in claim 1, wherein the quantity of the resultant surface retained austenite is 15% or more and the quantity of the resultant retained austenite in the depth of 50 $\mu$m from the surface is 20% or more.

4. A toroidal-type continuously variable transmission, comprising:

an input shaft supported so as to be freely rotatable;

an input side disk rotatable together with said input shaft and including an inner surface formed as a concave surface having an arc-shaped section;

an output side disk including an inner surface formed as a concave surface having an arc-shaped section, said output side disk being disposed concentrically with said input side disk in such a manner that said inner surface thereof is opposite to said inner surface of said input side disk;

a plurality of trunnions respectively swingable about their associated pivot shafts disposed at tortional positions with respect to said input shaft;

a plurality of displacement shafts respectively supported on said trunnions;

a plurality of power rollers each including a peripheral surface formed as a spherical-shaped convex surface, disposed on the inner surfaces of said trunnions, and rotatably supported in the peripheries of said displacement shafts while said power rollers are held by and between said input side and output side disks; and, thrust rolling bearings for supporting thrust loads applied to said power rollers, each of said thrust rolling bearings including:

an inner race raceway formed in the outer peripheral surface of said power roller; and an outer race disposed inside said trunnion and having an outer race raceway, wherein at least one of said concave surface of said input side disk, said concave surface of said output side disk, said convex surfaces of said power rollers, said inner race raceways and said outer race raceways of said thrust rolling bearings defines the surface residual compression stress being in the range from −780 to −1800 MPa, the quantity of the surface retained austenite being 15% or more, and the quantity of the retained austenite in the depth of 50 $\mu$m from the surface being 20% or more.

\* \* \* \* \*